(12) United States Patent
Hahn et al.

(10) Patent No.: US 11,193,554 B2
(45) Date of Patent: Dec. 7, 2021

(54) BEARING BUSH AND PRODUCTION METHOD FOR A BEARING BUSH

(71) Applicant: Sumitomo Riko Company Limited, Aichi (JP)

(72) Inventors: Kay Hahn, Schlüchtern-Herolz (DE); Dmitry Khlistunov, Bad Soden-Salmünster (DE); Aleksey Mysin, Bad Soden-Salmünster (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/160,328

(22) Filed: Jan. 27, 2021

(65) Prior Publication Data

US 2021/0293300 A1 Sep. 23, 2021

(30) Foreign Application Priority Data

Mar. 18, 2020 (DE) ...................... 10 2020 001 789.4

(51) Int. Cl.
*F16F 13/14* (2006.01)
(52) U.S. Cl.
CPC ...... *F16F 13/1445* (2013.01); *F16F 13/1481* (2013.01)
(58) Field of Classification Search
CPC ..... F16F 13/14; F16F 13/1445; F16F 13/1481
See application file for complete search history.

(56) References Cited

U.S. PATENT DOCUMENTS

| | | | | |
|---|---|---|---|---|
| 5,123,634 A | * | 6/1992 | Schwerdt | F16F 13/1481 267/140.12 |
| 5,657,510 A | * | 8/1997 | Satori | F16F 13/14 16/2.2 |
| 2009/0072454 A1 | * | 3/2009 | Graeve | F16F 13/14 267/121 |
| 2014/0117601 A1 | * | 5/2014 | Hermann | F16F 13/1445 267/140.11 |
| 2016/0047414 A1 | * | 2/2016 | Schnaars | F16F 13/1481 384/125 |
| 2017/0282447 A1 | * | 10/2017 | Suzuki | B29C 66/742 |
| 2019/0186586 A1 | * | 6/2019 | Klettke | F16F 13/1481 |
| 2020/0109760 A1 | * | 4/2020 | Sano | B60G 7/008 |
| 2021/0293300 A1 | * | 9/2021 | Hahn | F16F 13/1481 |

* cited by examiner

*Primary Examiner* — Vishal R Sahni
(74) *Attorney, Agent, or Firm* — JCIPRNET (57) ABSTRACT

A bearing bush and a method for producing a bearing bush are provided. The bearing bush includes a core element, an elastomer element, a cage element and a sleeve element. The cage element is at least partially embedded in the elastomer element. The elastomer element elastically connects the cage element and the core element to each other. The core element, the cage element and the elastomer element form a pre-assembly element. One of the sleeve element and the cage element includes a protrusion. The other of the sleeve element and the cage element includes a groove, which is engageable with the protrusion, in an assembled state of the bearing bush. The pre-assembly element is fixed in the sleeve element. The protrusion and the groove form a two-point contact in a cross-section.

11 Claims, 9 Drawing Sheets

BEARING BUSH AND PRODUCTION METHOD FOR A BEARING BUSH

CROSS REFERENCE TO RELATED APPLICATIONS

This application claims the priority benefit of German Patent Application No. 10 2020 001 789.4, filed on Mar. 18, 2020. The entirety of the above-mentioned patent application is hereby incorporated by reference herein and made a part of this specification.

TECHNICAL FIELD

The disclosure relates to a bearing bush and a method for producing a bearing bush.

BACKGROUND ART

Conventional bearing bushes substantially includes a core element, an elastomer element, a cage element and a sleeve element, wherein the core element and the cage element are typically elastically connected by the elastomer body and form a pre-assembly element. In an assembled state of conventional bearing bushes, the sleeve element and the cage element or the pre-assembly element are fixed relative to one another by one or more flat contact surfaces, in particular by end faces that are perpendicular to an axis of the bearing bush.

To achieve the fixing between the sleeve element and the cage element in conventional bearing bushes, these two elements, and in particular their fixing elements or fixing portions, are subject to certain manufacturing tolerances. In conventional bearing bushes, where the fixing between the sleeve element and the cage element is based on flat contact surfaces in the axial direction of the bearing bush, the manufacturing tolerances in the axial direction of the bearing bush are configured such that the axially inward fixing surfaces, e.g. of the sleeve element, can always be arranged between the axially outward fixing surfaces, e.g. of the cage element, during assembly such that when the cage element is arranged in the sleeve element in conventional bearing bushes, an axial play is formed between the sleeve element and the cage element. In other words, in conventional bearing bushes, the cage element and the sleeve element or the fixing elements of the cage element and the sleeve element are formed such that the fixing relative to one another is configured with an axial play. The axial play between the fixing elements of the sleeve element and the cage element in conventional bearing bushes leads to an undesirable relative movement between the sleeve element and the cage element during use or under load, which promotes damage to the bearing bush over prolonged periods of use, and thus leads to a shortening of the service lives of conventional bearing bushes.

If a shortening of the service lives is to be avoided in conventional bearing bushes and at the same time a secure fixing between the cage element and the sleeve element is to be ensured, and in a high press-out force for pressing out the cage element from the sleeve element is to be ensured, the axial play between the fixing elements of the sleeve element and the cage element in conventional bearing bushes can be reduced. However, in order to reduce the axial play between the fixing elements of the sleeve element and the cage element, the production or manufacture of the sleeve element and the cage element is subject to tight manufacturing tolerances, which leads to high production or manufacturing costs and/or to a high rate of rejects in the production or manufacture of sleeve elements and cage elements.

SUMMARY

The present disclosure provides a bearing bush and a method for producing a bearing bush, wherein the fixing of a sleeve element and a cage element relative to one another is formed such that the service life of the bearing bush is increased, and at the same time, a secure fixing between the cage element and the sleeve element is ensured, and a high press-out force for pressing out the cage element from the sleeve element is ensured, without increasing the production or manufacturing costs.

This disclosure can be achieved by providing a bearing bush and a production method for the bearing bush according to the subject matter of the independent claims, and preferred embodiments are the subject matter of the dependent claims.

An aspect of the disclosure relates to a bearing bush comprising: a core element, an elastomer element, a cage element and a sleeve element, wherein the cage element is at least partially embedded in the elastomer element; the elastomer element elastically connects the cage element and the core element to each other; and the core element, the cage element and the elastomer element form a pre-assembly element; one of the sleeve element and the cage element has a protrusion; the other of the sleeve element and the cage element has a groove, which is engageable with the protrusion; in an assembled state of the bearing bush, the pre-assembly element is fixed in the sleeve element, and the protrusion and the groove form a two-point contact in a cross-section.

Advantageously, in an assembled state of the bearing bush according to the disclosure, the bearing bush described above allows the pre-assembly element that comprises the core element, the cage element and the elastomer element to be securely fixed in the sleeve element, in that, one of the sleeve element and the cage element comprises a protrusion, and the other of the sleeve element and the cage element comprises a groove, wherein the protrusion and the groove form a two-point contact in a cross-section along an axis of the bearing bush. When the pre-assembly element is assembled in the sleeve element or when the pre-assembly element is pressed into the sleeve element, the protrusion can snap into the groove to fix the pre-assembly element in the sleeve element. The protrusion and the groove are formed on a radially outer side of the cage element and on a radially inner side of the sleeve element as the case may be.

The two-point contact that forms between protrusion and groove of the sleeve element and the cage element in the cross-section in an assembled state of the bearing bush allows a defined contact to be achieved between the sleeve element and the cage element here in order to fix the pre-assembly element, which comprises the cage element, in the sleeve element, such as in the axial direction. The two-point contact here can be obtained as a result of pre-defined geometries of the protrusion and the groove, such that the two-point contact forms only during assembly of the pre-assembly element in the sleeve element. The two-point contact here can form by itself without being explicitly predefined.

With the aid of the sleeve element and the cage element of the bearing bush according to the disclosure, an axial play between the pre-assembly element and the sleeve element can be reduced or prevented, while only less stringent manufacturing requirements, such as axial manufacturing tolerances, exist for the sleeve element and the cage element. Thus, with the aid of the bearing bush according to the disclosure, both the service life of the bearing bush can be increased and the production or manufacture of the bearing bush can be simplified and can also be achieved cost-effectively.

By means of the two-point contact, a fixing of the pre-assembly element in the sleeve can be achieved such that a further axial fixing, e.g., by a flat contact of portions of the sleeve element and the cage element or by crimping, is unnecessary. In other words, the bearing bush can be formed such that it is free from flat contacts of portions of the sleeve element and the cage element and/or free from crimping. However, it is also possible to provide a flat contact of portions of the sleeve element and the cage element and/or crimping as an additional fixing.

In exemplary embodiments, protrusion and groove of the respective sleeve element and cage element can be configured in a peripherally encompassing manner, wherein the peripheral direction can correspond to the circumferential direction. In other words, protrusion and groove can be formed such that they extend peripherally continuously in the circumferential direction. By means of a peripherally extending formation of the protrusion and groove of the respective sleeve element and cage element, an even distribution of load and/or force over the circumference is permitted.

In other alternative embodiments, protrusion and/or groove of the respective sleeve element and cage element can be peripherally interrupted, i.e. in other words formed in portions in the circumferential direction.

Because the cage element is at least partially embedded in the elastomer element, the elastomer element can be arranged not only radially inside the cage element for the elastic connection to the core element but also partially radially outside the cage element. By means of a partial arrangement of the elastomer element radially outside the cage element, the elastomer element can be used functionally between the cage element and the sleeve element, e.g., as a sealant or damping means, whereby a bearing bush with an improved seal or a bearing bush with improved damping characteristics can be provided. It is also possible for a layer of the elastomer element to cover the protrusion or groove that is formed on the cage element.

Furthermore, according to the bearing bush of the disclosure, the sleeve element can comprise the protrusion and the cage element can comprise the groove. Alternatively, according to the bearing bush of the disclosure, the cage element can comprise the protrusion and the sleeve element can comprise the groove. With regard to the configuration of the bearing bush and thus also the manufacture or production of the bearing bush, and of the sleeve element and the cage element, this provides a degree of freedom that allows the bearing bush as a whole or the sleeve element and the cage element specifically to be configured to meet particular requirements.

Various terms will be used repeatedly below, which the following definitions should make it easier to understand.

Axial direction: bearing bushes are often formed in a substantially cylindrical manner or as a contoured hollow shape in some portions or in some regions. The axial direction here roughly represents the cylindrical axis, or the axis of the contoured hollow shape, and in other words is subject to only slight deviations from the cylindrical axis or the axis of the contoured hollow shape.

Cross-section: a cross-section of a bearing bush can be defined in different ways and represents a sectional view or aspect in a particular orientation. A cross-section here can be defined perpendicular to the axial direction of the bearing bush, and thus means a section whose surface has a substantially perpendicular span in relation to the axial direction of the bearing bush. Another cross-section, on the other hand, can be defined substantially along an axial direction or along an axis of a bearing bush, and thus means a section whose surface is configured such that the axis of the bearing bush lies therein. A cross-section defined in this way, i.e. a cross-section along an axis of a bearing bush, is substantially perpendicular or normal to a cross-section perpendicular to the axial direction of the bearing bush. To define a two-point contact between a groove and a protrusion, in the present explanations the cross-section along an axial direction or an axis of the bearing bush is used. In other words, the cross-section for describing the two-point contact is a cross-section along the axial direction or the axis of the bearing bush. In the circumferential direction of the sleeve element or of the cage element the two-point contact can, at least in some portions, represent a two-line contact.

Two-point contact: the term "two-point contact" is mainly used here in connection with a cross-section or another aspect as a reference. The two-point contact specifically, like a point contact in general, describes a geometric contact between the elements concerned, here mainly a protrusion and a groove. The reference of the two-point contact or point contact to a cross-section represents a reference to a surface, and so it means a two-dimensional aspect which thus differs from a three-dimensional aspect. The two-point contact or point contact here is made between geometric shapes which, according to their geometries, only touch at a certain number of points. The two-point contact therefore describes two geometric shapes or elements touching at two points in a two-dimensional aspect, e.g. a cross-section. These touch points in a two-point contact can in the simplest case be formed e.g. between pointed and blunt geometries, between pointed and pointed geometries or between blunt and blunt geometries, the geometries being configured relative to one another such that the two-point contact is formed. The term "blunt geometries" is also intended to mean round and rounded geometries. For example, the protrusion can be substantially rectangular, triangular, trapezoid, arcuate or similar in cross-section, and the groove can be e.g. substantially rectangular, triangular, trapezoid, arcuate or similar in cross-section. The two-point contact or point contact in the cross-section of a bearing bush, when the bearing bush is viewed in three dimensions, leads to a linear contact at least in part and thus differs from a surface contact when viewed in three dimensions.

Since in the manufacture or production of machine elements these are generally produced and used without sharp edges, i.e. are deburred or rounded, a two-point contact or two-line contact means a substantially punctiform or linear contact.

Pre-assembly element: the pre-assembly element comprises the core element, the cage element and the elastomer element of a bearing bush, wherein the pre-assembly element can be produced e.g. in a vulcanization step, such as in a vulcanization tool. By applying or injecting an elastic material between the core element and the cage element, and optionally also around the cage element, in the exemplary vulcanization step the elastomer element that elastically connects the cage element and the core element to each other can be obtained from the elastic material. By the exemplary vulcanization step, for example the cage element can also be partially embedded in the elastomer element.

The bearing bush can be configured to connect together a first component and a second component in an elastically displaceable and/or damping manner. The core element can be formed to be connected to the first component or it can already be part of the first component. The core element can be formed from a substantially rigid material, such as e.g. plastics or metal. The sleeve element can be formed to be connected to the second component or it can already be part of the second component. The sleeve element can be formed from a substantially rigid material, such as e.g. plastic or metal. The cage element can likewise be formed from a substantially rigid material, such as e.g. plastic or metal.

In exemplary embodiments, at least one of the cage element and the sleeve element can comprise or consist of plastic in order to be readily elastically deformable, allowing simple assembly of the cage element into the sleeve element to be achieved.

For example, the cage element can comprise or consist of plastic and the sleeve element can comprise or consist of metal. Alternatively, the cage element can comprise or consist of plastic and the sleeve element can comprise or consist of a material other than plastic. The fact that the cage element comprises or consists of plastic allows a simple elastic deformability of the cage element to be achieved, such as during assembly of the cage element into the sleeve element, which in turn allows a preferred and simple assembly of the cage element into the sleeve element to be achieved.

For example, the sleeve element can also comprise or consist of plastic and the cage element can comprise or consist of metal. Alternatively, the sleeve element can comprise or consist of plastic and the cage element can comprise or consist of a material other than plastic. The fact that the sleeve element comprises or consists of plastic allows a simple elastic deformability of the sleeve element to be achieved, such as during assembly of the cage element into the sleeve element, which in turn allows a preferred and simple assembly of the cage element into the sleeve element to be achieved.

Furthermore, for example, the cage element and the sleeve element can comprise or consist of plastic. The fact that both the cage element and the sleeve element comprise or consist of plastic means that the cage element and the sleeve element can each be simply elastically deformed, which allows a further preferred and simple assembly of the cage element into the sleeve element to be achieved.

In preferred embodiments, the protrusion substantially has a shape of a circular segment with a first radius, and the groove substantially has a shape of a circular segment with a second radius, the first radius preferably being greater than the second radius.

Furthermore, the first radius always refers to the radius of a circular segment of the protrusion, while the second radius always refers to the radius of a circular segment of the groove or of a hollow circular segment of the groove. Moreover, the shapes of the protrusion and groove are described in relation to a cross-section of the bearing bush along an axial direction of the bearing bush or an axis of the bearing bush.

The protrusion, which has a circular segment as its shape or geometry in a cross-section along the axial direction of the bearing bush or the axis of the bearing bush, is substantially formed as a full or convex profile of a circular segment. The material with which the protrusion is formed as a full profile here can correspond to the material of the one sleeve element or cage element comprising the protrusion or can be a material deviating from the element comprising the protrusion. The protrusion can be formed integrally, i.e. in one piece, with the element comprising the protrusion. Optionally, the protrusion can also be formed in a plurality of pieces with the element comprising the protrusion, i.e. the protrusion can be attached to the element comprising the protrusion by a separate manufacturing step, such as e.g. by the welding, adhesive bonding or other fastening of elements to the element comprising the protrusion.

The groove, which has a circular segment as its shape or geometry in the cross-section along the axial direction of the bearing bush or the axis of the bearing bush, is substantially formed as a hollow or concave profile. Thus, the groove can be formed by a removal of material from the element comprising the groove, such as e.g. by turning or milling. Alternatively, the groove can also be formed by attaching elements to the element comprising the groove, such as e.g. by the welding, adhesive bonding or other fastening of elements to the element comprising the groove.

In exemplary embodiments, the circular segment possessed by the protrusion as its shape or geometry can comprise less than half of a circle as the circular segment. In further alternative embodiments, the circular segment possessed by the protrusion as its shape or geometry can comprise more than half of a circle as the circular segment.

For the shape or geometry of the protrusion, compared to a circular segment formed as more than half of a circle, a circular segment formed as less than half of a circle allows the protrusion to be produced readily and cost-effectively and at the same time facilitates assembly between the sleeve element and the cage element or between the sleeve element and the pre-assembly element, since lower assembly forces or press-in forces are needed for assembly.

In exemplary embodiments, the circular segment or hollow circular segment possessed by the groove as its shape or geometry can comprise less than half of a hollow circle as the circular segment. In further alternative embodiments, the circular segment or hollow circular segment possessed by the groove as its shape or geometry can comprise more than half of a hollow circle as the circular segment.

For the shape or geometry of the groove here, a circular segment formed as less than half of a hollow circle allows this to be produced readily and cost-effectively. The groove having a shape of a circular segment that comprises less than half of a hollow circle can ensure a two-point contact between two blunt geometries such that, starting from the contact points of the two-point contact, loads or forces are distributed advantageously into the abutting element in each case and overloads can be effectively avoided in the region of the contact points of the two-point contact. For the shape of the groove, therefore, a circular segment formed as less than half of a hollow circle allows the service life of a bearing bush to be increased.

By means of the preferred configuration of the protrusion having a shape or geometry of a circular segment with a first radius that is greater than a second radius possessed by a circular segment of the groove, a two-point contact is ensured between the protrusion and the groove or between the elements comprising the protrusion and groove, i.e., the sleeve element and the cage element. By ensuring the two-point contact by selecting the radius ratio such that the first radius of the circular segment of the protrusion in a cross-section along the axis of the bearing bush is greater than the second radius of the circular segment of the groove, likewise in a cross-section along the axis of the bearing bush, the pre-assembly element can be fixed in the sleeve element without the need for or the presence of an axial play. In other words, owing to the fact that the protrusion is formed with a circular segment having a first radius that is greater than a second radius of a circular segment of the groove, when the pre-assembly element is introduced into the sleeve element, the two-point contact forms automatically or by itself, on both of the axial sides of the circular segment of the protrusion that are obtained in relation to a vertex of the protrusion. In yet other words, the radius ratio described above results in the division of the two-point contact between protrusion and groove such that one point contact forms in the axially forward portion of the protrusion towards the groove and a further point contact forms in the axially rearward portion of the protrusion towards the groove.

Furthermore, the preferred radius ratio described above can allow the two-point contact to form automatically or by itself. The two-point contact between protrusion and groove can form by itself e.g. as a function of the precise radius ratio of the respective circular segments of the protrusion and groove. In other words, according to the present disclosure an exact predefinition of the radii of the circular segments is not necessary for a two-point contact to form between the respective circular segments of the protrusion and groove. Thus, the manufacture or production of protrusion and groove or of the respective elements comprising the protrusion and groove are not subject to close tolerances but only to less stringent manufacturing requirements, and so a simple and cost-effective manufacture or production of the bearing bush can be achieved. Furthermore, as a result of the two-point contact that forms between the respective circular segments of the protrusion and groove, an axial play between protrusion and groove, and thus between the sleeve element and the cage element, can be avoided. The avoidance of an axial play between the sleeve element and the cage element in turn increases the service life of the bearing bush.

Thus, with the aid of the bearing bush according to the disclosure, the service life can be effectively prolonged or increased while at the same time reducing the manufacturing or production costs for the bearing bush and for sleeve elements and cage elements of the bearing bush according to the disclosure.

Preferably, a ratio of the first radius to the second radius is in the range of more than about 1.0 to about 1.4, and preferably in the range of more than about 1.0 to about 1.1.

In other words, a ratio of the first radius, of the circular segment of the protrusion, to the second radius, of the circular segment of the groove, is in the range of more than about 1.0 to about 1.4 and preferably in the range of more than about 1.0 to about 1.1.

A radius ratio of more than about 1.0 means values starting from 1.0, wherein the two-point contact between protrusion and groove, in cross-section along the axis of the bearing bush, only forms at values greater than or more than 1.0.

By means of the radius ratio or ratio of the first radius of the circular segment of the protrusion to the second radius of the circular segment of the groove, the penetration depth of the protrusion into the groove is determined, and thus the load transfer or force transfer between the sleeve element and the cage element is influenced. For instance, under load or during use of the bearing bush it can happen that an elastic deformation of the bearing bush occurs, which is accompanied by an elastic deformation of the sleeve element and/or the cage element, leading to a relative axial shift between the sleeve element and the cage element.

With a large radius ratio of the first radius of the circular segment of the protrusion to the second radius of the circular segment of the groove, the protrusion penetrates into the groove only slightly such that in the event of a relative axial shift, even only a slight one, between the sleeve element and the cage element, protrusion and groove slide past each other and a secure fixing by protrusion and groove no longer exists between the sleeve element and the pre-assembly element. In other words, there is the possibility that with a large radius ratio of the first radius to the second radius, an adequate force transfer no longer takes place between protrusion and groove for the bearing bush under load. For this reason, it is useful to adjust the radius ratio or ratio of the first radius of the circular segment of the protrusion to the second radius of the circular segment of the groove such that it is not too large.

By means of the radius ratio or ratio of the first radius of the circular segment of the protrusion to the second radius of the circular segment of the groove of more than about 1.0 to about 1.4, on the one hand a two-point contact, in cross-section along the axis of the bearing bush, between protrusion and groove is ensured and on the other hand an advantageous penetration depth of the protrusion in the groove is ensured. In other words, a radius ratio of the first radius to the second radius of more than about 1.0 to about 1.4 allows the two-point contact between protrusion and groove to be ensured and at the same time allows an adequate force transfer between the sleeve element and the cage element, and thus of the bearing bush as a whole, to be ensured.

Furthermore, by means of the preferred radius ratio or ratio of the first radius of the circular segment of the protrusion to the second radius of the circular segment of the groove of more than about 1.0 to about 1.1, the effect described above is reinforced further such that on the one hand a two-point contact between protrusion and groove is ensured and on the other hand an advantageous force transfer between the sleeve element and the cage element, and thus through the bearing bush as a whole, is ensured.

In alternative embodiments, independently of the shape of the groove, the shape or geometry of the protrusion can also have a polygonal surface, such as a triangular surface, rectangular surface or trapezoidal surface, based on the element comprising the protrusion.

In further alternative embodiments, independently of the shape of the protrusion, the shape or geometry of the groove can have a polygonal surface as a hollow profile and can have a triangular surface, rectangular surface or trapezoidal surface as a hollow profile, based on the element comprising the groove.

Preferably, the two-point contact is formed between the sleeve element and the cage element, and the cage element is exposed in the region of the two-point contact.

In other words, the two-point contact can be formed between the sleeve element and the cage element, with the cage element not comprising a portion of the elastomer element in the region of the two-point contact.

In exemplary embodiments, owing to the fact that the cage element is embedded in the elastomer element, the elastomer element can protrude into the region of the two-point contact of the cage element such that the elastomer element is arranged between the sleeve element and the cage element in the region of the two-point contact. The arrangement of the elastomer element in the two-point contact between the sleeve element and the cage element can bring about further load damping effects, which can be controlled by the thickness of the elastomer element in the region of the two-point contact.

In further exemplary embodiments, the two-point contact can be formed directly between the sleeve element and the cage element, with the cage element being exposed in the region of the two-point contact, i.e., in other words there is no elastomer element in the region of the two-point contact between the sleeve element and the cage element.

Advantageously, the cage element that is exposed in the region of the two-point contact allows a rigid or stable fixing to be provided between the sleeve element and the cage element.

Preferably, at least one of the sleeve element and the cage element comprises a material that is readily elastically deformable for a rigid material (i.e., a readily elastically deformable material), optionally, the readily elastically deformable material is a plastic or fiber-reinforced plastic.

Advantageously, the fact that at least one of the sleeve element and the cage element comprises a readily deformable material makes it possible for the pre-assembly element that comprises the cage element to be readily pressed or assembled into the sleeve element. In other words, the at least one of the sleeve element and the cage element that comprises a readily deformable material facilitates the readily deformable nature of the sleeve element and/or cage element, as a result of which only low press-in forces are needed to press or arrange the pre-assembly element in the sleeve element and, in addition, very little or no damage occurs when the pre-assembly element is pressed or arranged in the sleeve element.

By manufacturing or producing at least one of the sleeve element and the cage element from plastics, such as e.g. PA, PP, PE, EP resins, PMMA, PEEK, PUR, easy elastic deformability of the sleeve element and/or cage element can be ensured. A sleeve element and/or cage element that comprises or consists of PA provides both adequate stability or strength and a preferred elastic deformability.

By manufacturing or producing at least one of the sleeve element and the cage element from fiber-reinforced plastics, such as PA, PP, PE, EP resins, PMMA, PEEK, PUR with a specific glass fiber content, such as e.g. PA6GF60, PA66GF60, PA6GF50, PA66GF50, PA6GF40, PA66GF40, PA6GF30, PA66GF30, PA6GF15 or PA66GF15, the plastic can additionally be stiffened. The stiffness of the sleeve element and/or cage element can be increased in a specific direction depending on the fiber alignment in the particular element. Thus, for example, a substantially axial alignment of the glass fiber arrangement in the sleeve element and/or cage element allows the stiffness of the sleeve element and/or cage element to be increased in the axial direction without increasing the stiffness in the peripheral direction, which leads to a stiffening of the bearing bush in the axial direction while the assembly of the pre-assembly element in the sleeve element or of the cage element in the sleeve element is not negatively affected.

In further exemplary embodiments, the sleeve element and/or cage element can comprise or consist of fiber-reinforced plastics as a material, in which case fiber volume contents of more than about 0% to about 60% can be used.

For example, the sleeve element and/or the cage element can comprise or consist of plastics reinforced with short fibers. Short-fiber-reinforced plastics of the sleeve element and/or cage element offer preferred degrees of freedom in production and a substantially isotropic reinforcement, i.e. a non-directional reinforcement of the element provided or produced therewith.

In further exemplary embodiments, the sleeve element and/or the cage element can comprise or consist of plastics reinforced with long fibers. Long-fiber-reinforced plastics of the sleeve element and/or the cage element have increased strength compared to short-fiber-reinforced plastics and in addition they allow the targeted reinforcement of the sleeve element and/or cage element in one or more predefined directions, such as e.g., the axial direction of a bearing bush. For instance, long-fiber-reinforced plastics of the sleeve element and/or cage element allow a secure fixing to be ensured between cage element and sleeve element, and allow a high press-out force to be ensured for pressing the cage element out of the sleeve element.

In further alternative embodiments, the sleeve element and/or the cage element of the bearing bush according to the disclosure can also comprise metallic materials to provide a rigid fixing between sleeve element and cage element.

Preferably, the protrusion can be provided at an axial end of the element comprising the protrusion.

In other words, the protrusion can be arranged at an axial end of the cage element if the cage element comprises the protrusion, or at an axial end of the sleeve element if the sleeve element comprises the protrusion.

Further preferably, the groove can be provided at an axial end of the element comprising the groove.

In other words, the groove can be arranged at an axial end of the cage element if the cage element comprises the groove, or at an axial end of the sleeve element if the sleeve element comprises the groove.

Advantageously, the provision of the protrusion and/or groove at an axial end of the particular element comprising the protrusion or groove permits simple assembly, wherein depending on the precise configuration of the sleeve element and the cage element only a small axial region between the sleeve element and the cage element comprises a mutual radial overlap and so a pressing-in or specific press-in forces are only needed over a small axial region to assemble the cage element in the sleeve element or to assemble the pre-assembly element comprising the cage element in the sleeve element. The term "axial end" can mean a region of the cage element or the sleeve element occupying about 10% or about 15% of the axial length of the cage element or the sleeve element, starting from the axial terminal edge.

Advantageously, the provision of the protrusion and/or groove at an axial end of the particular element comprising the protrusion or groove furthermore allows the element comprising the protrusion or groove, i.e., the sleeve element and/or cage element, to be produced simply and in addition allows the latching of the protrusion in the groove to be monitored during assembly by a visual inspection.

Thus, by providing the protrusion and/or groove at an axial end of the particular element comprising the protrusion or groove, the production or manufacture and assembly of the bearing bush as a whole can be facilitated or simplified.

In further exemplary embodiments, the groove can be arranged on a radial projection of the element comprising the groove. The radial projection of the element comprising the groove on which the groove is arranged can be configured by a radial extension starting from the element comprising the groove towards the element comprising the protrusion, wherein the radial extension of the radial projection on which the groove is arranged is preferably greater than a radial extension of the protrusion.

In the event that the sleeve element comprises the groove, the radial projection on which the groove is arranged can preferably be configured radially inwardly, towards the cage element. In the event that the cage element comprises the groove, the radial projection on which the groove is arranged can preferably be configured radially outwardly, towards the sleeve element.

Advantageously, by arranging the groove on a radial projection, it is possible that the protrusion is only pressed radially in part of a width or axial extension of the radial projection when the pre-assembly element is pressed into the sleeve element. As a result, the assembly or pressing in of the pre-assembly element into the sleeve element is facilitated and possible damage is reduced or avoided when pressing the pre-assembly element into the sleeve element.

Preferably, the bearing bush is a hydraulic bearing bush, in which case the elastomer element preferably comprises at least one chamber for a damping fluid, wherein when the elastomer element comprises a plurality of chambers, the plurality of chambers is connected by at least one channel, which is provided by the elastomer element, and the elastomer element has a sealing lip, which is provided radially between the sleeve element and the cage element.

In preferred embodiments, the bearing bush according to the disclosure can be a hydraulic bearing bush. As a result of the defined two-point contact that forms between protrusion and groove in a cross-section along the axis of the bearing bush, and because the forces for fixing are concentrated at the two points of contact, a stable fixing can be ensured, which is also suitable for hydraulic bearing bushes, i.e., both hydrodynamic bearing bushes and hydrostatic bearing bushes.

For example, one or more chambers or fluid chambers for a damping fluid can be provided by the elastomer element. By way of example, in hydrostatic bearing bushes and in the case of a plurality of chambers or fluid chambers, these chambers can be in fluid communication with at least one channel extending through the elastomer element. Advantageously, this provides a bearing bush which has high damping characteristics and stable fixing and at the same time is simple to produce or manufacture. The chambers and/or the at least one channel can be delimited radially outwardly by the sleeve element in the assembled state.

By way of example, the elastomer element can be configured with a sealing lip to prevent leakage of the damping fluid. Advantageously, the fact that the elastomer element is configured with a sealing lip allows the safety of the bearing bush during use to be increased.

For example, the elastomer element can be configured with a sealing lip which, in the assembled state of the bearing bush, is arranged radially between a portion of the sleeve element and a portion of the cage element. By arranging a sealing lip of the elastomer element radially between a portion of the sleeve element and a portion of the cage element, a sealing of the one or more fluid chambers can be ensured in a preferred manner and the leakage of damping fluid can be prevented.

Preferably, the protrusion and the groove form a sealing function for the damping fluid.

As further sealing, in addition to a sealing lip of the elastomer element or instead of a sealing lip of the elastomer element, the protrusion and the groove can form a sealing function by the two-point contact, by the concentration of the fixing forces at the just two contact points. This sealing function can furthermore be enhanced e.g. by the fact that the cage element is not exposed in the region of the two-point contact, but is covered at least in part by the elastomer element. Furthermore, the sealing function formed by protrusion and groove can be improved by certain materials comprised by the sleeve element and cage element. For example, the plastics and fiber-reinforced plastics already mentioned above, which the sleeve element and cage element comprise or of which they consist, support the sealing function formed by protrusion and groove for the damping fluid.

A further aspect of the disclosure relates to a method for producing or assembling a bearing bush, comprising:
  providing a core element;
  providing a cage element;
  elastically connecting the core element and the cage element by an elastomer element, wherein the core element, the cage element and the elastomer element form a pre-assembly element;
  providing a sleeve element, wherein
    one of the sleeve element and the cage element comprises a protrusion, and
    the other of the sleeve element and the cage element comprises a groove that is engageable with the protrusion; and
  fixing the pre-assembly element in the sleeve element such that, in an assembled state of the bearing bush, the protrusion and the groove form a two-point contact in a cross-section.

The above explanations relating to the bearing bush also apply mutatis mutandis to the production method.

Embodiments of the disclosure will be described in more detail below with the aid of the attached figures. It goes without saying that the present disclosure is not limited to these embodiments and that individual features of the embodiments can be combined to form further embodiments within the framework of the attached claims.

DESCRIPTION OF EMBODIMENTS

Figure 1:
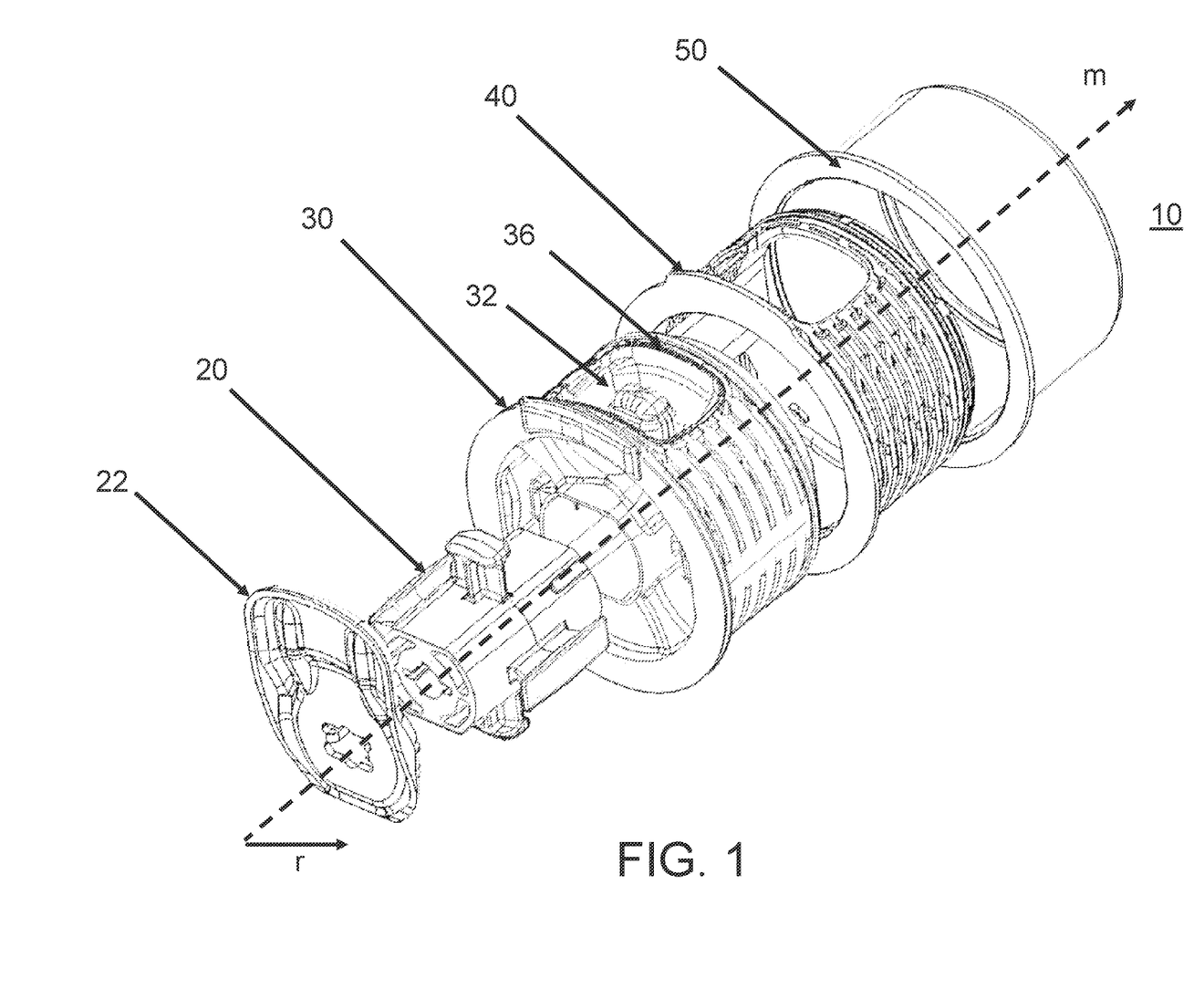
FIG. 1 is a perspective exploded view of a bearing bush or hydraulic bearing bush.

FIG. 1 is a perspective exploded view of a bearing bush 10, which is in the form of a hydraulic bearing bush in the present case. The bearing bush 10 here comprises a stop 22, a core 20, an elastomer element 30, a cage element 40 and a sleeve element 50. An axial direction m here corresponds substantially to the axis of the bearing bush 10. A radial direction r is perpendicular to the axial direction m and corresponds to a substantially radial direction of the bearing bush 10.

The elastomer element 30 is configured to connect the core element 20 and the cage element 40 elastically. The core element 20, the elastomer element 30 and the cage element 40 here form a pre-assembly element, which is pre-assembled or pre-manufactured in a step preceding the assembly of the bearing bush. The preassembly or pre-manufacturing step of the pre-assembly element that comprises the core element 20, the elastomer element 30 and the cage element 40 can comprise e.g. vulcanization.

In a further step, the pre-assembly element comprising the core element 20, the elastomer element 30 and the cage element 40 is assembled in the sleeve element 50. The assembly step for assembling the pre-assembly element in the sleeve element 50 can comprise e.g. pressing in. The assembly of the pre-assembly element into the sleeve element here can be performed in the axial direction m.

As also shown in FIG. 1, the elastomer element 30 can comprise at least one chamber or fluid chamber 32, which is configured to accommodate a damping fluid. In the case of a plurality of chambers or fluid chambers 32, these fluid chambers 32 can be in fluid communication with each other through one or more fluid channels. However, fluid channels are not shown in FIG. 1. With the aid of the at least one fluid chamber 32, which the elastomer element 30 comprises, the bearing bush 10 can act as a hydraulic bearing bush.

The hydraulic bearing bush 10, compared with a non-hydraulic bearing bush, can exhibit a load-specific and thus advantageous damping in use or under load, but generally requires a seal. In FIG. 1, a sealing lip 36 is shown as a possible seal for the bearing bush 10. This sealing lip 36 can be configured in this case to be arranged radially between the cage element 40 and the sleeve element 50 in the assembled state of the bearing bush, thereby allowing the prevention of a possible leakage of a damping fluid between the cage element 40 or the pre-assembly element and the sleeve element 50.

It is also possible for an additional, or even an only, sealing function between the cage element 40 and the sleeve element 50 to be provided by a two-point contact between the sleeve element 50 and the cage element 40 or between the sleeve element 50 and the pre-assembly element comprising the cage element 40. A secure sealing of a hydraulic bearing bush 10 can be ensured thereby. The two-point contact between the sleeve element 50 and the cage element 40 or between the sleeve element 50 and the pre-assembly element comprising the cage element 40 is described more precisely with the aid of the further figures.

Figure 2:
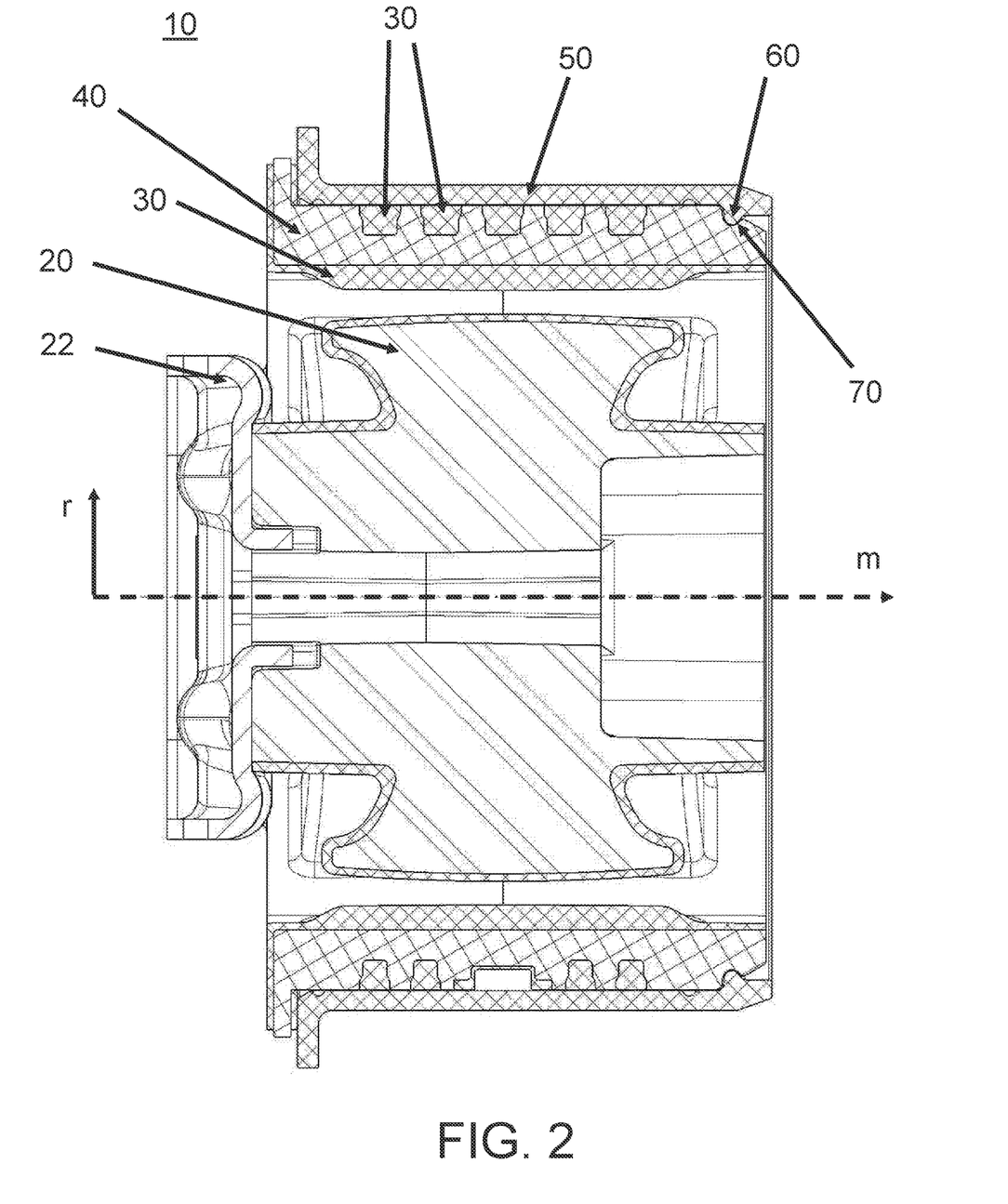
FIG. 2 is a sectional diagram of a bearing bush or hydraulic bearing bush from FIG. 1 in the assembled state.

FIG. 2 is a sectional diagram of a bearing bush 10 according to FIG. 1, but in the assembled state. The sectional diagram according to FIG. 2 here is a cross-section along the axial direction m or along the axis of the bearing bush 10. Furthermore, the section plane of the sectional diagram according to FIG. 2 is rotated in a peripheral direction relative to a possible opening of the elastomer element 30, which is shown in FIG. 1 to illustrate a possible fluid chamber 32.

As illustrated in FIG. 2, the cage element 40 is at least partially embedded in the elastomer element 30 such that the elastomer element 30 is arranged both radially inside the cage element 40 in part and radially outside the cage element 40 in part.

Furthermore, FIG. 2 shows by way of example that a protrusion 60 can be arranged at an axial end of the sleeve element 50 and a groove 70 can be arranged at an axial end of the cage element 70. As already mentioned, in further embodiments by way of example the protrusion 60 can also be arranged on the cage element 40, at an axial end of the cage element 40, and the groove 70 can be arranged on the sleeve element 50, at an axial end of the sleeve element 50.

Moreover, in further embodiments further protrusions 60 and further grooves 70 can be formed on the cage element 40 and the sleeve element 50. Preferably, the number of protrusions 60 corresponds to the number of grooves 70. Further preferably, the protrusions 60 are only arranged on one of the cage element 40 and the sleeve element 50, and accordingly the grooves 70 are preferably only arranged on the other of the cage element 40 and the sleeve element 50.

Figure 3A:
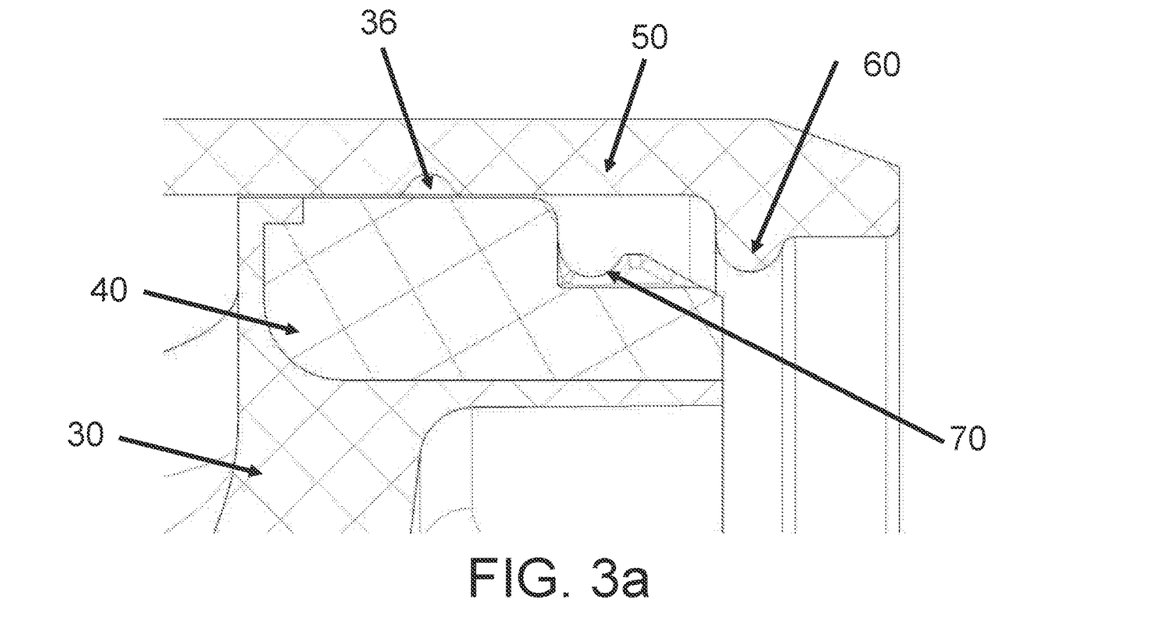
FIG. 3a is an enlargement of a region of a bearing bush or hydraulic bearing bush in an incompletely assembled state.

FIG. 3a is an enlargement of a region of a bearing bush 10 in a cross-section along the axial direction m or along the axis of the bearing bush, in the incompletely assembled state. In this case the pre-assembly element is or the elements comprised by the pre-assembly element are already arranged at least regionally in the sleeve element 50 by an assembly in the axial direction m according to FIG. 1. As illustrated in FIG. 3a, there is still a distance between protrusion 60 and groove 70 in the axial direction m, such that the bearing bush 10 is not yet in the completely assembled state.

As further illustrated by FIG. 3a, the protrusion 60 and the groove 70 can be arranged at an axial end of the sleeve element 50 and of the cage element 40, such that only a small axial region between the sleeve element 50 and the cage element 40 has a mutual radial overlap. Thus, when the pre-assembly element is being assembled in the sleeve element 50, advantageously, only low assembly forces or press-in forces are necessary for an assembly into the assembled state, as shown in FIG. 3a. Furthermore, an elevated assembly force or elevated press-in force is only necessary for a small axial region between the sleeve element 50 and the cage element 40 owing to the fact that the sleeve element 50 and the cage element 40 overlap radially.

Figure 3B:
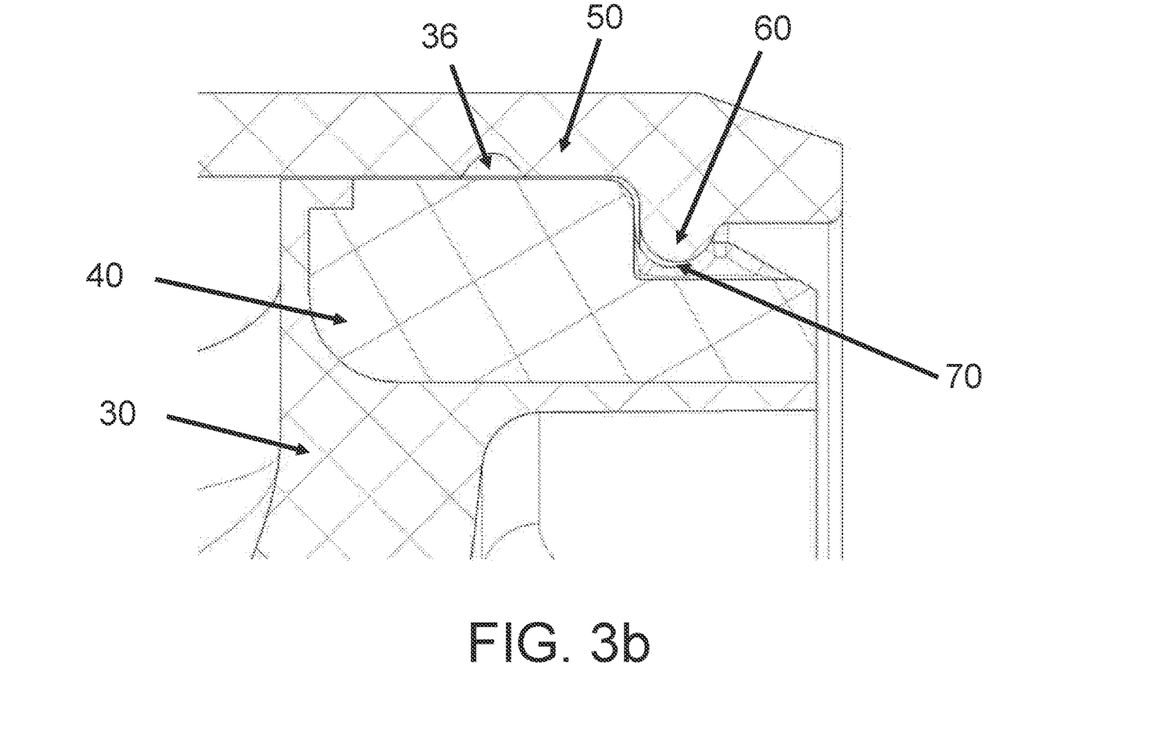
FIG. 3b is an enlargement of a region of a bearing bush or hydraulic bearing bush according to FIG. 3a in the assembled state.

FIG. 3b is an enlargement of a region of a bearing bush 10 according to FIG. 3a, likewise in a cross-section along the axial direction m or the axis of the bearing bush 10 in the assembled state. In the assembled state, as shown by FIG. 3b, the protrusion 60 is arranged at least in part in the groove 70.

Figure 4:
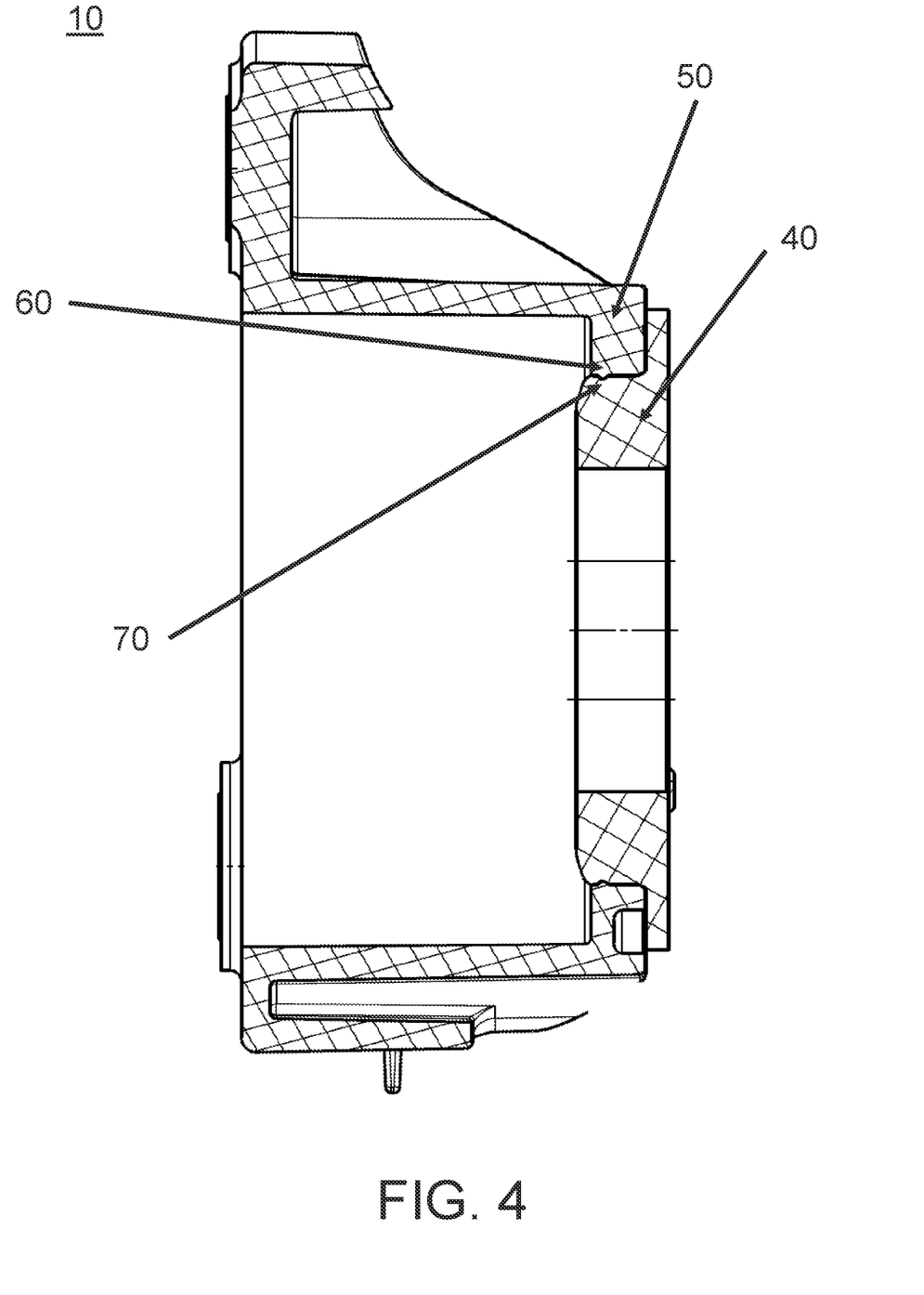
FIG. 4 is a sectional diagram of a further bearing bush.

FIG. 4 is a sectional diagram of a further bearing bush 10. The sleeve element 50 here is shown as a contoured element having various attachment possibilities or attachment points for fixing the sleeve element 50 in or on a component provided for the purpose. Furthermore, FIG. 4 shows an exemplary embodiment, wherein the sleeve element 50 has a protrusion 60 and the cage element 40 has a groove.

Furthermore, FIG. 4 shows that, in addition to a groove 70, a cage element 40 can have an axial stop portion, which can be in contact with a complementary stop portion of the sleeve element 50.

Figure 5A:
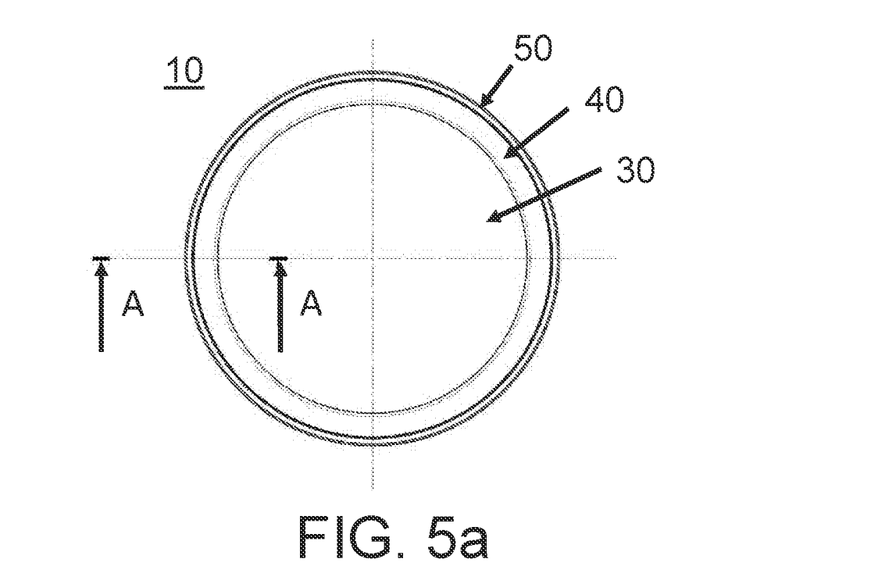
FIG. 5a is a front view of a further bearing bush.
Figure 5B:
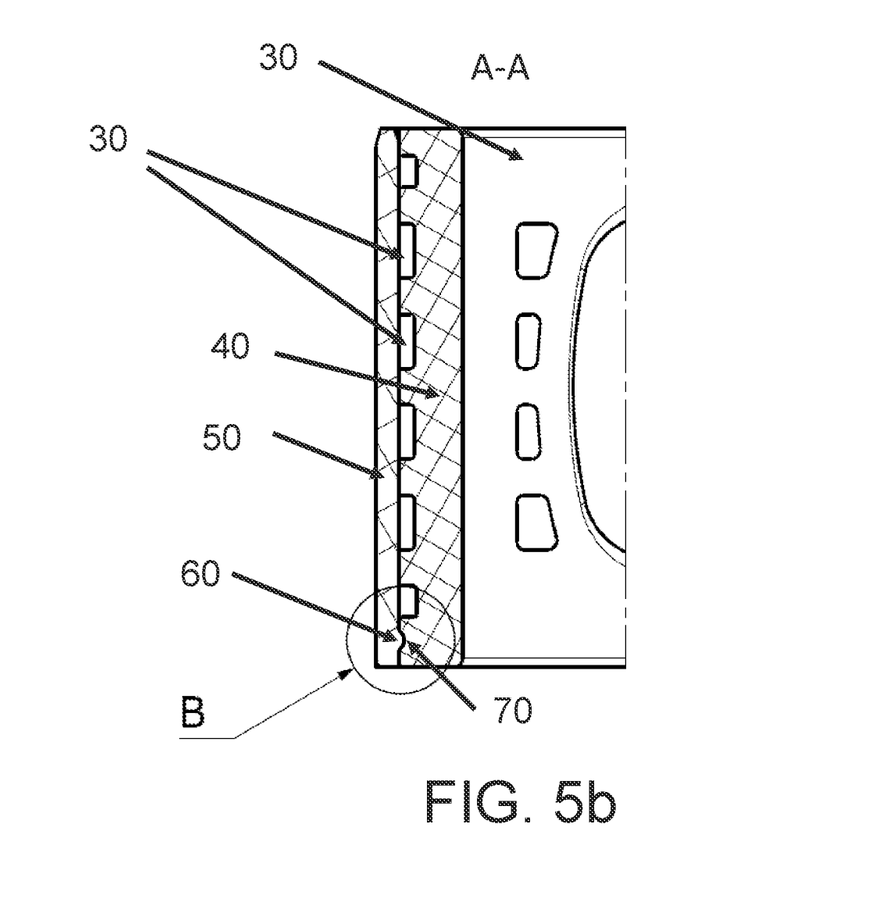
FIG. 5b is a sectional diagram of a further bearing bush.

FIG. 5a is a front view of a further bearing bush 10. Furthermore, a section line A-A is shown in FIG. 5a, which runs in the radial direction of the bearing bush 10, providing a sectional view as shown in FIG. 5b. The sectional view according to FIG. 5b thus spans a two-dimensional illustration along a radial direction r and along an axial direction m or along an axis of the bearing bush 10.

FIG. 5b is a sectional diagram of a further bearing bush 10, as obtained e.g. with the aid of the section line A-A through the bearing bush 10 according to FIG. 5a. As can be seen in the sectional diagram in FIG. 5b, the bearing bush 10 shown by way of example is formed only with a protrusion 60 and a groove 70 for fixing the pre-assembly element or the cage element 40 comprised by the pre-assembly element in the sleeve element 50.

Figure 6:
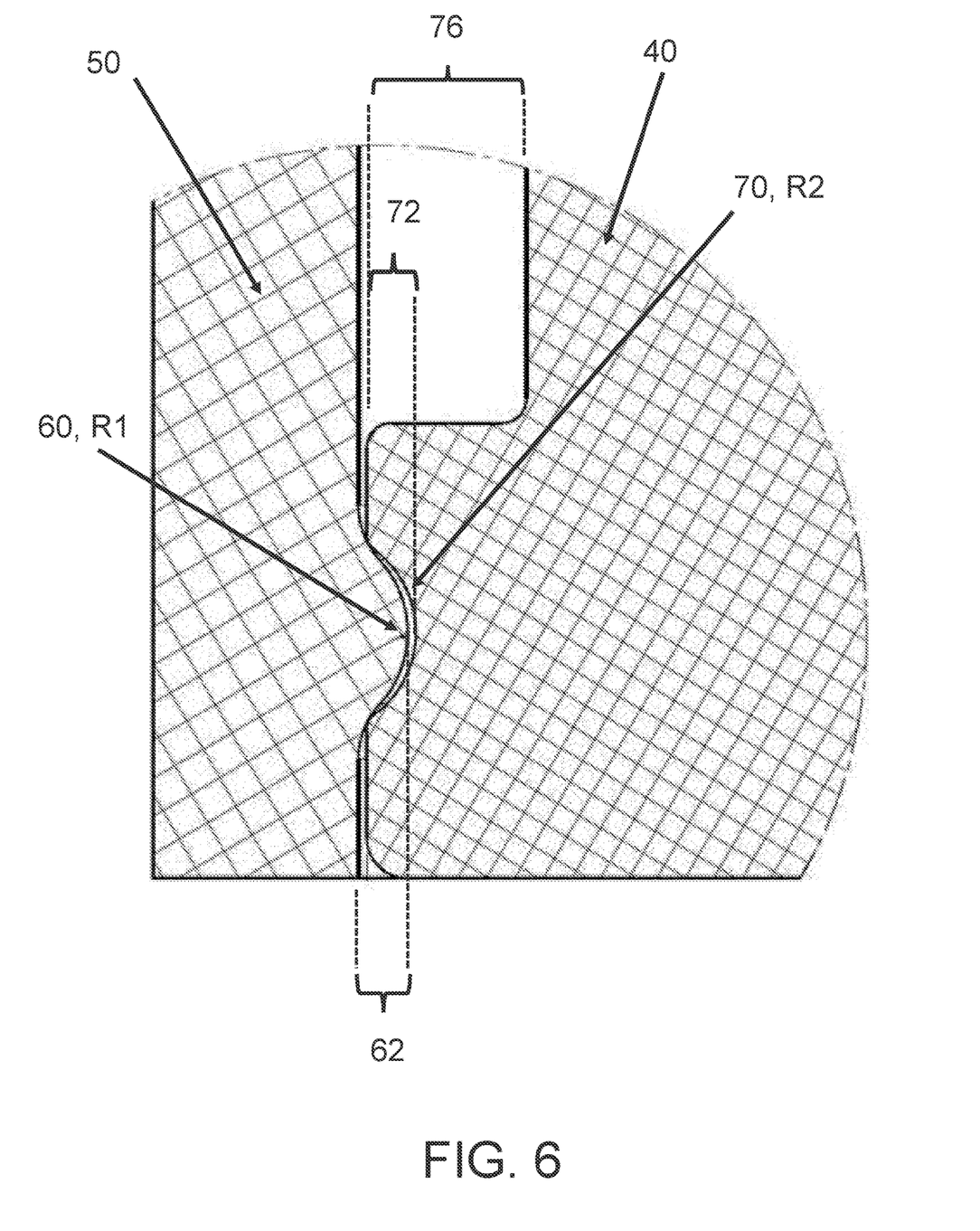
FIG. 6 is an enlargement of a region of the sectional diagram according to FIG. 5b.
Figure 7A:
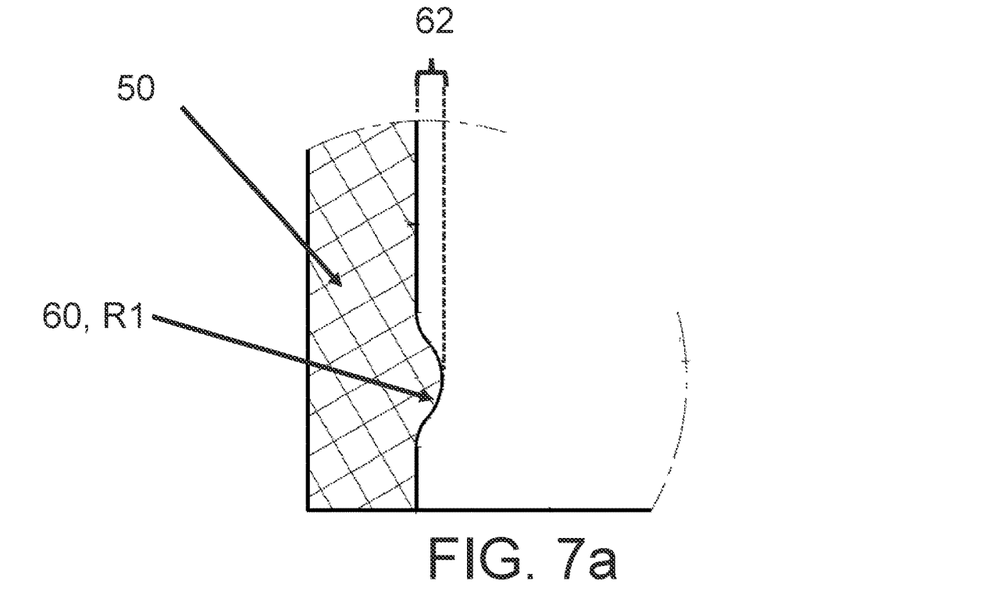
FIG. 7a is a part of the sleeve element according to the enlargement from FIG. 6.
Figure 7B:
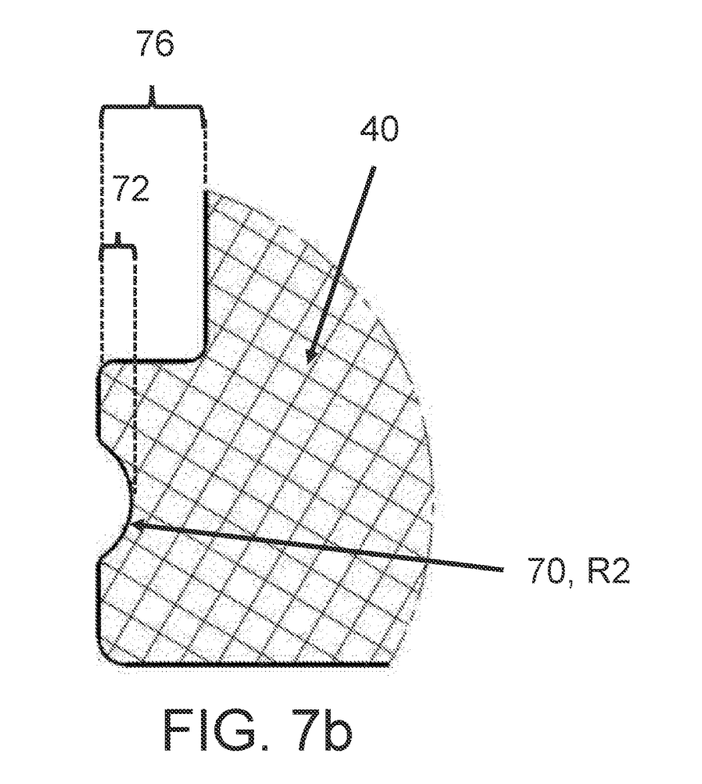
FIG. 7b is a part of the cage element according to the enlargement from FIG. 6.

Furthermore, FIG. 5b shows an enlarged region B, which comprises the protrusion 60 and the groove 70, for further explanation of protrusion 60 and groove 70 with the aid of FIGS. 6, 7a and 7b.

FIG. 6 is an enlargement of a region of the sectional diagram according to FIG. 5b and as indicated by the letter B. As shown by FIG. 6 in a cross-section running along the axial direction m according to FIG. 1, by way of example the sleeve element 50 comprises the protrusion 60 and the cage element 40 comprises the groove 70. The protrusion 60 has a shape of a circular segment with a first radius R1 and the groove 70 has a shape of a circular segment with a second radius R2, the first radius R1 being greater than the second radius R2. According to FIG. 6 the protrusion 60 has a shape of a circular segment that represents less than half of a circle. Furthermore, according to FIG. 6, the groove 70 has a shape that represents less than half of a circle as a hollow space or hollow shape.

Furthermore, FIG. 6 shows the assembled state of a bearing bush 10, wherein the protrusion 60 is arranged at least in part in the groove 70.

As a result of the geometric shapes of the protrusion 60 and the groove 70, each substantially as a circular segment with the first radius R1 of the circular segment of the protrusion being greater than the second radius R2 of the circular segment of the groove, a two-point contact between protrusion 60 and groove 70 is obtained automatically or by itself as a function of the precise shapes or geometries of the protrusion 60 and the groove 70. By means of the two-point contact between protrusion 60 and groove 70, the cage element 40 or the pre-assembly element comprising the cage element 40 is fixed in the sleeve element 50. Furthermore, it is made clear by the two-point contact that forms between protrusion 60 and groove 70 that the vertices of the geometries or shapes of the protrusion 60 and the groove 70 do not touch.

As illustrated by FIG. 6, the radii R1 and R2 of the circular segments of the protrusion 60 and the groove 70 can each vary at will, with the two-point contact always forming or forming automatically by itself provided that the radius R1 is greater than the radius R2. This gives rise to the possibility of selecting the manufacturing tolerances for the manufacture or production of the cage element 40 and the sleeve element 50 such that they are sufficiently large, whereby the manufacture or production of the cage element 40 and the sleeve element 50 can be simplified and carried out cost-effectively. At the same time, an axial play between the cage element 40 and the sleeve element 50 is prevented by the fact that a two-point contact is formed between protrusion 60 and groove 70, as shown in FIG. 6.

Furthermore in FIG. 6, a radial projection 76 on which the groove 70 is arranged, a radial extension 72 of the groove 70 and a radial extension 62 of the protrusion 60 are also illustrated. As shown in FIG. 6 by way of example, the element comprising groove 70 can be configured with a radial projection 76, in which case the groove 70 is formed inside the region comprising the radial projection 76 opposite the element comprising the further groove 70. In FIG. 6, where by way of example the groove 70 is arranged on the cage element 40, the radial projection 76 extends towards the sleeve element 50.

The radial extension 62 of the protrusion 60 is obtained starting from the region comprising protrusion 60 of the element comprising protrusion 60 in the radial direction r towards the vertex of the protrusion 60 or the part of the protrusion 60 mostly projecting in the radial direction r towards the element comprising groove 70.

The radial extension 72 of the groove 70 is obtained starting from the region comprising groove 70 of the element comprising groove 70 in the radial direction r towards the vertex of the groove 70 or the part of the groove 70 mostly projecting in the radial direction r away from the element comprising protrusion 60.

The radial projection 76, which is preferably greater than the radial extension 62 of the protrusion 60, makes it possible when assembling the pre-assembly element or the cage element 40 comprised by the pre-assembly element that the protrusion 60 is radially pressed only in a partial region of a width or a partial region of an axial extension of the radial projection 76. Thus the assembly or pressing in of the pre-assembly element or the cage element 40 comprised by the pre-assembly element into the sleeve element 50 is facilitated and possible damage to the protrusion 60, the element comprising the protrusion 60 or the element comprising the groove 70 when pressing the pre-assembly element into the sleeve element 50 is reduced or even avoided.

The dimensions of the bearing bush 10 as well as the dimensions of the sleeve element 50 and the cage element 40, like the dimensions of the protrusion 60 and the groove 70, are not limited and can be freely selected according to the desired application or embodiment.

Exemplary embodiments, such as for application in the automotive sector, can have e.g. a radial extension 62 of the protrusion 60 ranging from about 0.2 mm to about 1.0 mm, preferably ranging from about 0.4 mm to about 0.8 mm and preferably of about 0.6 mm, and a radial extension 72 of the groove 70 ranging from about 0.2 mm to about 1.0 mm, preferably ranging from about 0.4 mm to about 0.8 mm and preferably of about 0.6 mm, while an exemplary first radius R1 of a circular segment of the protrusion 60 is, by way of example, in the range of about 0.8 mm to about 1.8 mm, preferably in the range of about 1.0 mm to about 1.6 mm and preferably about 1.3 mm, and an exemplary second radius R2 of a circular segment of the groove 70 is, by way of example, in the range of about 0.75 mm to about 1.75 mm, preferably in the range of about 0.95 mm to about 1.55 mm and preferably about 1.25 mm.

Furthermore, to ensure the two-point contact in exemplary embodiments, the ratio of the radius R1 of a circular segment of the protrusion 60 to the radius R2 of a circular segment of the groove 70 is in the range of more than about 1.0 to about 1.4, preferably in the range of more than about 1.0 to about 1.2 and preferably more than about 1.0 to about 1.1.

By means of a radius ratio or ratio of the first radius R1 of a circular segment of the protrusion 60 to the second radius R2 of a circular segment of the groove 70 close to 1.0 or just over 1.0, an advantageous and adequate penetration depth of the protrusion 60 can be ensured for arrangement in the groove 70. An adequate penetration depth of the protrusion 60 in the groove 70 in turn allows a force transfer between the element comprising the protrusion and the element comprising the groove, even in the case of a deflection of one of the elements under load or in use.

Furthermore, as a result of a low radial extension 62 compared to the first radius R1 of a circular segment of the protrusion 60, only a low deformation of the elements to be assembled together occurs during assembly or when the pre-assembly element or the cage element 40 comprised by the pre-assembly element is pressed into the sleeve element

50. The fact that the deformation of the elements to be assembled together, i.e., the cage element 40 and the sleeve element 50, is only low furthermore reduces the probability of damage during assembly of the elements to be assembled together, i.e., the cage element 40 and the sleeve element 50.

FIG. 7a shows a part of the sleeve element 50 according to the enlargement region B from FIG. 6, while FIG. 7b shows a part of the cage element 40 according to the enlargement region B from FIG. 6. FIGS. 7a and 7b serve to illustrate the radial projection 76, the radial extension 62 of the protrusion 60 and the radial extension 72 of the groove 70. By way of example, and according to FIG. 6, the sleeve element 50 is configured to comprise the protrusion 60, with a circular segment of radius R1, and the cage element 40 is configured to comprise the groove 70, with a circular segment of radius R2.

In further exemplary embodiments, the sleeve element 50 is configured to comprise the groove 70, with a circular segment of radius R2, and the cage element 40 is configured to comprise the protrusion 60, with a circular segment of radius R1. Furthermore, in further exemplary embodiments, the sleeve element 50 can comprise a radial projection 72, which facilitates assembly and requires lower assembly forces as well as causing less damage during assembly if groove 70 and/or protrusion 60 are not arranged at an axial end of the particular element comprising the groove 70 or protrusion 60.

Figure 8:
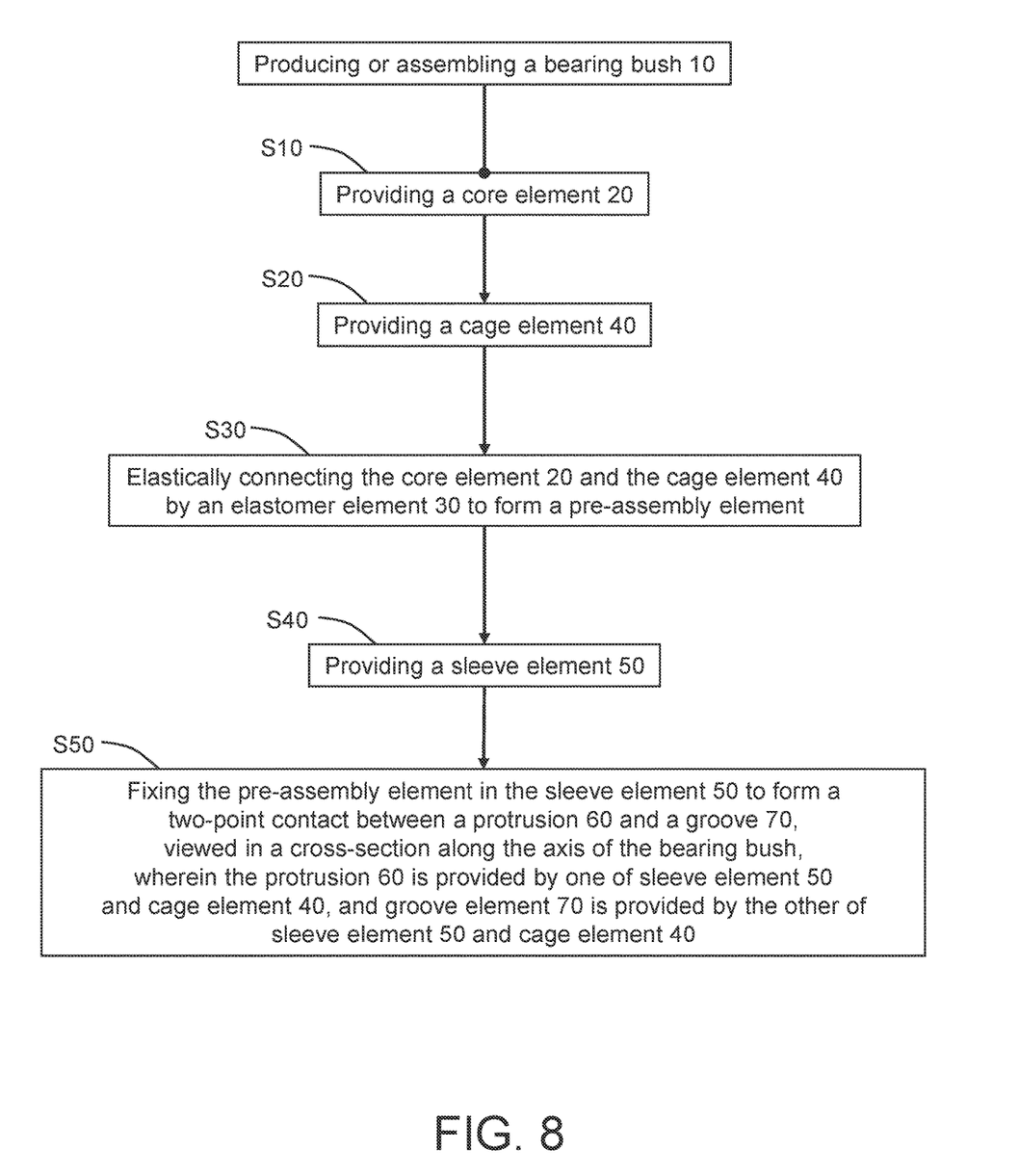
FIG. 8 is a flow diagram for the production or assembly of a bearing bush.

FIG. 8 is a flow diagram for the production or assembly of a bearing bush 10, comprising the following steps:

Starting with S10: Providing a core element 20.

S20: Providing a cage element 40.

S30: Elastically connecting the core element 20 and the cage element 40 by an elastomer element 30 to form a pre-assembly element. For example, the step S30 can be achieved by vulcanization.

S40: Providing a sleeve element 50.

S50: Fixing the pre-assembly element in the sleeve element 50 to form a two-point contact between a protrusion 60 and a groove 70 in a cross-section along the axis of the bearing bush or the axial direction m, the protrusion 60 being provided by one of the sleeve element 50 and the cage element 40, and the groove 70 being provided by the other of the sleeve element 50 and the cage element 40.

In other words, one of the sleeve element 50 and the cage element 40 comprises a groove 70 and the other of the sleeve element 50 and the cage element 40 comprises a protrusion 60. In preferred embodiments, the protrusion 60 is configured as a circular segment having a radius R1 which is greater than a radius R2 of a circular segment comprised by the groove 70 or comprised as a hollow shape by the groove 70.

FIGS. 9a to 9i are examples of shapes for protrusion 60 and groove 70 for forming a two-point contact. Besides the illustrated shapes shown, further geometric shapes are possible for each of protrusion 60 and groove 70 and are combinable with each other, which can serve to form a two-point contact between protrusion and groove.

Figure 9A:
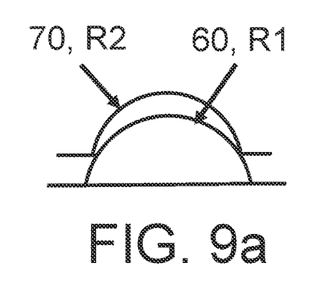
FIGS. 9a-9i are examples of shapes or geometries for protrusion and groove for forming a two-point contact.
Figure 9B:
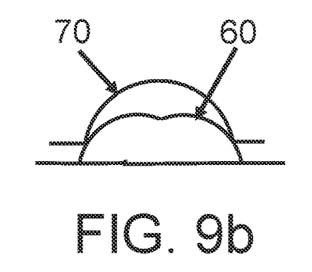
Figure 9C:
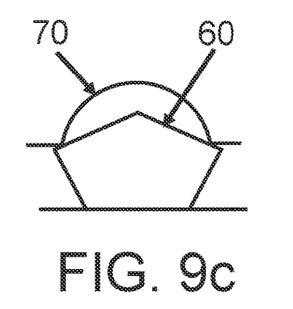
Figure 9D:
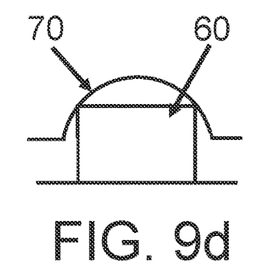
Figure 9E:
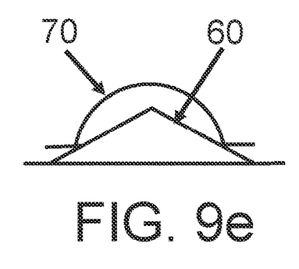
Figure 9F:
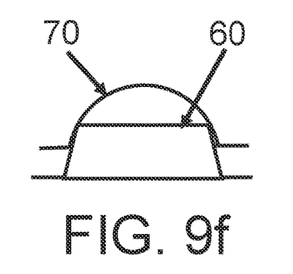
Figure 9G:
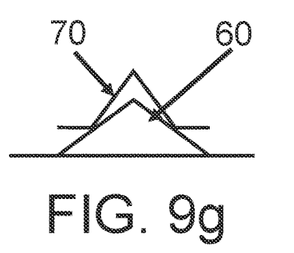
Figure 9H:
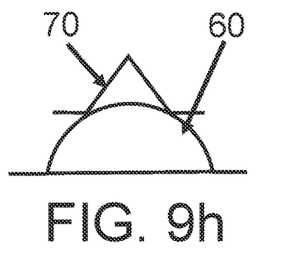
Figure 9I:
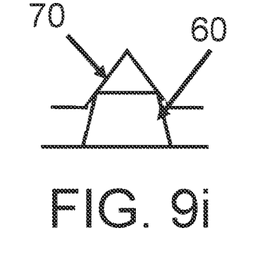

The figures show the following:

FIG. 9a: a protrusion 60 in the shape of a circular segment with a radius R1 that is greater than a radius R2, which describes the shape of a circular segment of a groove 70;

FIG. 9b: a protrusion 60 in the shape of a double circular segment and a groove 70 in the shape of a single circular segment;

FIG. 9c: a protrusion 60 in the shape of a polygon, such as a pentagon, and a groove 70 in the shape of a circular segment;

FIG. 9d: a protrusion 60 in the shape of a rectangle and a groove 70 in the shape of a circular segment;

FIG. 9e: a protrusion 60 in the shape of a triangle and a groove 70 in the shape of a circular segment;

FIG. 9f: a protrusion 60 in the shape of a trapezium and a groove 70 in the shape of a circular segment;

FIG. 9g: a protrusion 60 in the shape of a triangle and a groove 70 in the shape of a triangle, wherein both triangles are configured as equilateral triangles and preferably the base of the triangle of the protrusion is larger than the base of the triangle of the groove;

FIG. 9h: a protrusion 60 in the shape of a circular segment and a groove 70 in the shape of a triangle; and FIG. 9i: a protrusion 60 in the shape of a trapezium and a groove 70 in the shape of a triangle.

What is claimed is:

1. A bearing bush, comprising:
   a core element;
   an elastomer element;
   a cage element; and
   a sleeve element, wherein
   the cage element is at least partially embedded in the elastomer element,
   the elastomer element elastically connects the cage element and the core element to each other, and
   the core element, the cage element and the elastomer element form a pre-assembly element;
   one of the sleeve element and the cage element comprises a protrusion,
   the other of the sleeve element and the cage element comprises a groove, which is engageable with the protrusion,
   in an assembled state of the bearing bush, the pre-assembly element is fixed in the sleeve element, and
   the protrusion and the groove form a two-point contact in a cross-section.

2. The bearing bush according to claim 1, wherein
   the protrusion substantially has a shape of a circular segment with a first radius, and
   the groove substantially has a shape of a circular segment with a second radius, wherein
   the first radius is greater than the second radius.

3. The bearing bush according to claim 2, wherein
   a ratio of the first radius to the second radius is in the range of more than about 1.0 to about 1.4.

4. The bearing bush according to claim 3, wherein
   a ratio of the first radius to the second radius is in the range of more than about 1.0 to about 1.1.

5. The bearing bush according to claim 1, wherein
   the two-point contact is formed between the sleeve element and the cage element, and
   the cage element is exposed in the region of the two-point contact.

6. The bearing bush according to claim 1, wherein
   at least one of the sleeve element and the cage element comprises a readily elastically deformable material.

7. The bearing bush according to claim 6, wherein
   the readily elastically deformable material is plastic or fiber-reinforced plastic.

8. The bearing bush according to claim 1, wherein
   the protrusion is provided at an axial end of the element comprising the protrusion, and/or
   the groove is provided at an axial end of the element comprising the groove.

9. The bearing bush according to claim 1, wherein
   the bearing bush is a hydraulic bearing bush, wherein the elastomer element comprises at least one chamber for a damping fluid, wherein when the elastomer element comprises a plurality of chambers, the plurality of chambers is connected by at least one channel, provided by the elastomer element, and the elastomer element comprises a sealing lip, which is provided radially between the sleeve element and the cage element.

10. The bearing bush according to claim 9, wherein the protrusion and the groove form a sealing function for the damping fluid.

11. A production method of a bearing bush, comprising:

providing a core element;

providing a cage element;

elastically connecting the core element and the cage element by an elastomer element, wherein the core element, the cage element and the elastomer element form a pre-assembly element;

providing a sleeve element, wherein
- one of the sleeve element and the cage element comprises a protrusion, and
- the other of the sleeve element and the cage element comprises a groove, which is engageable with the protrusion; and fixing the pre-assembly element in the sleeve element such that, in an assembled state of the bearing bush, the protrusion and the groove form a two-point contact in a cross-section.

* * * * *